US011868841B1

(12) United States Patent
Barkan et al.

(10) Patent No.: US 11,868,841 B1
(45) Date of Patent: Jan. 9, 2024

(54) BI-OPTIC BARCODE READERS WITH SPECIALLY DESIGNED PLATTERS

(71) Applicant: ZEBRA TECHNOLOGIES CORPORATION, Lincolnshire, IL (US)

(72) Inventors: Edward Barkan, Miller Place, NY (US); Darran Michael Handshaw, New York, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/870,186

(22) Filed: Jul. 21, 2022

(51) Int. Cl.
*G06K 7/10* (2006.01)
*G01G 19/414* (2006.01)

(52) U.S. Cl.
CPC ....... *G06K 7/1096* (2013.01); *G01G 19/4144* (2013.01)

(58) Field of Classification Search
CPC ............... G06K 7/1096; G07G 1/0072; G01G 19/4144; G01G 19/415; G01G 21/22; G01G 21/28; G06Q 20/208
USPC .......................... 235/383; 177/239, 262, 264
See application file for complete search history.

(56) References Cited

U.S. PATENT DOCUMENTS

| | | | | |
|---|---|---|---|---|
| 6,481,626 B1* | 11/2002 | Nahar | ................ | G06K 7/10871 235/462.43 |
| 2012/0138672 A1* | 6/2012 | Herwig | .............. | G06K 7/10722 235/375 |
| 2014/0224554 A1* | 8/2014 | Drzymala | ............ | G07G 1/0072 177/245 |

FOREIGN PATENT DOCUMENTS

CN             108151858 A   *   6/2018

OTHER PUBLICATIONS

Machine translation of CN 108151858, retrieved Mar. 23, 2023 (Year: 2023).*

* cited by examiner

*Primary Examiner* — Suezu Ellis
(74) *Attorney, Agent, or Firm* — Yuri Astvatsaturov

(57) ABSTRACT

At least some embodiments of the present invention are directed to barcode readers having weigh platters. In an example, a barcode reader includes a weigh platter having a central region, a proximal edge region, a first lateral edge region, a second lateral edge region, and a distal edge region, where a the first lateral edge of the first lateral edge region and a second lateral edge of the second lateral edge region extends above a transverse plane defined by the central region.

15 Claims, 7 Drawing Sheets

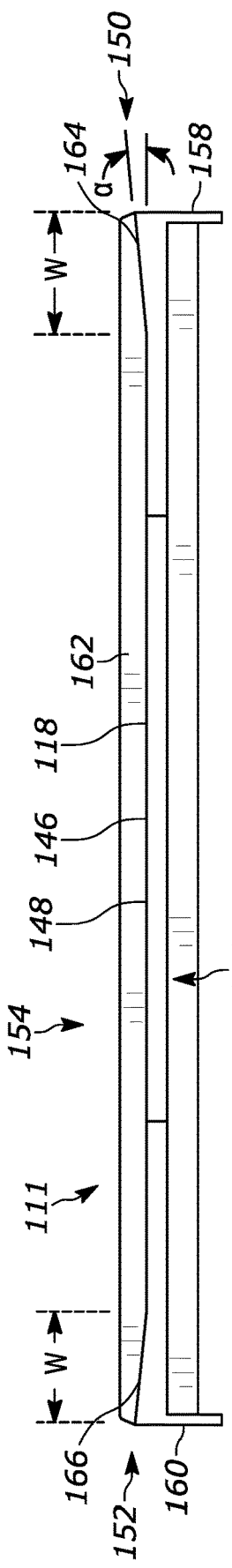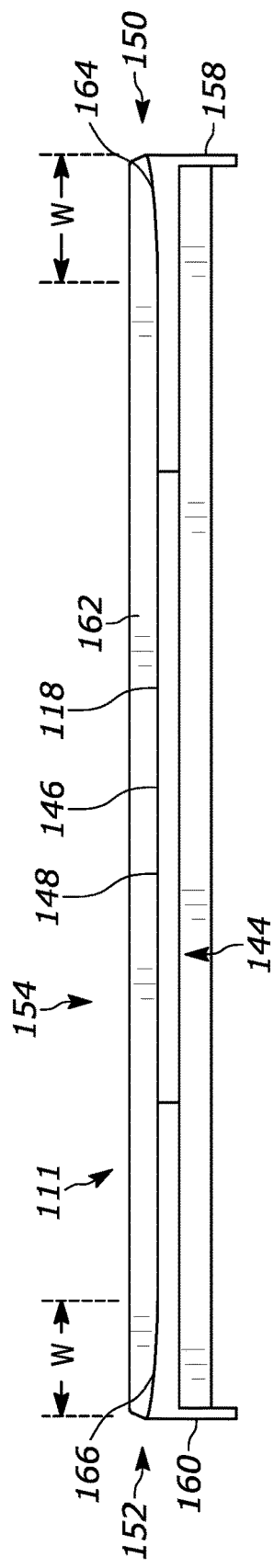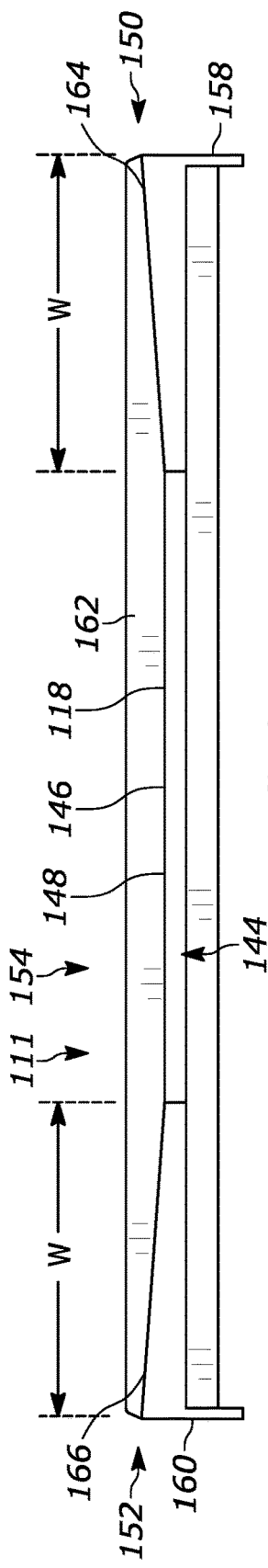

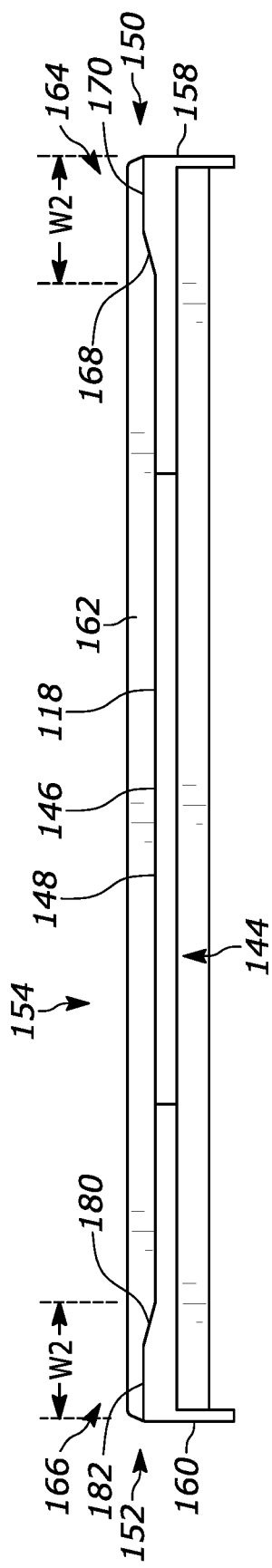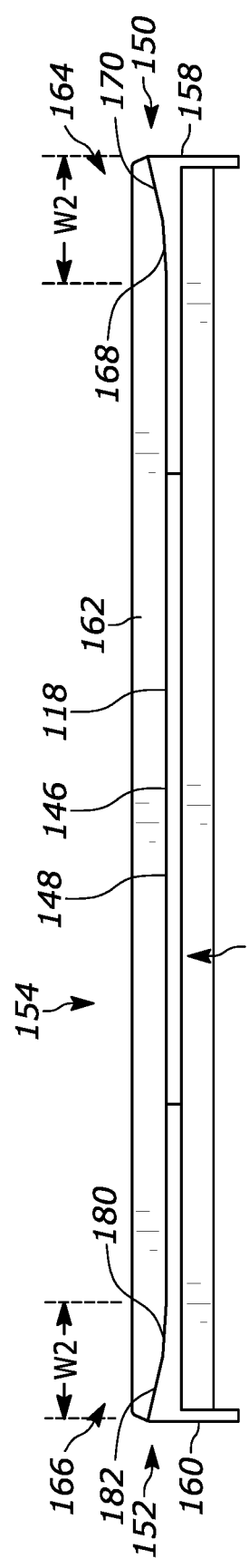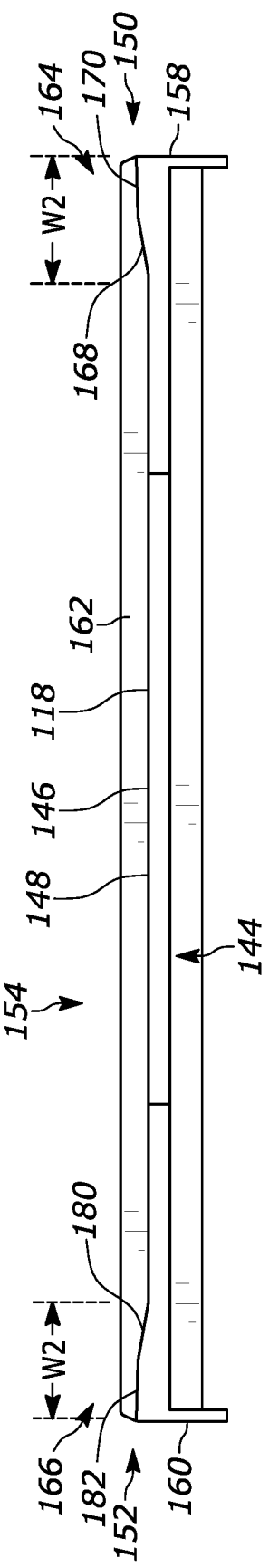

BI-OPTIC BARCODE READERS WITH SPECIALLY DESIGNED PLATTERS

BACKGROUND

Bi-optic barcode readers are commonly used in retail and grocery store venues to help facilitate various transaction. Whether used by cashiers or by purchasers during a checkout process, these readers are typically configured to read barcodes that are attached to products and, in some instances, obtain weight data associated with items being purchased. In latter instances, an item is normally placed on a weigh platter that is further connected to a scale, allowing the weight of the item to be obtained for further processing. It is desirable to provide these weigh platters with varying configurations for appropriate applications.

SUMMARY

In an embodiment the present invention is a barcode reader comprising: a housing having a lower housing portion with an upper surface facing a product scanning region and an upper housing portion extending above the lower housing portion; and a weigh platter configured to support an object placed on the weigh platter for obtaining a weight of the object. The weigh platter has: a central region extending in a transverse plane, the central region including a window configured to permit light to pass therethrough, the window having a transparent medium having a top surface extending parallel to the transverse plane; a proximal edge region adjacent the upper housing portion and having a proximal edge; a first lateral edge region extending non-parallel to the proximal edge and having a first lateral edge, the first lateral edge region being positioned along one side of the window; a second lateral edge region, opposite the first lateral edge region, extending non-parallel to the proximal edge and having a second lateral edge, the second lateral edge region being positioned along another side of the window; and a distal edge region, opposite the proximal edge region, extending non-parallel to the first and second lateral edges and having a distal edge, wherein each of the first lateral edge and the second lateral edge extends at least 1 mm above the transverse plane. In other implementations, each of the first lateral edge and the second lateral edge extends at least 2 mm above the transverse plane.

In yet another embodiment, the present invention is a barcode reader for use in a workstation having a workstation surface. The barcode reader includes: a housing having an upper surface facing a product scanning region where a product is expected to be presented to the barcode reader in a swiping motion along a swiping direction; and a weigh platter configured to support an object placed on the weigh platter for obtaining a weight of the object. The weigh platter has: a central region extending in a transverse plane, the central region including a window configured to permit light to pass therethrough, the window having a transparent medium having a top surface extending parallel to the transverse plane; a proximal edge region having a proximal edge extending substantially along the swiping direction; a first lateral edge region extending non-parallel to the proximal edge and having a first lateral edge, the first lateral edge region being positioned along one side of the window; a second lateral edge region, opposite the first lateral edge region, extending non-parallel to the proximal edge and having a second lateral edge, the second lateral edge region being positioned along another side of the window; and a distal edge region, opposite the proximal edge region, extending non-parallel to the first and second lateral edges and having a distal edge, wherein each of the first lateral edge and the second lateral edge extends above the transverse plane.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

FIGS. 4-10 are perspective cross sections, taken along section line 143 of FIG. 3, illustrating respective exemplary configurations of the weigh platter of FIG. 3.

Figure 1:
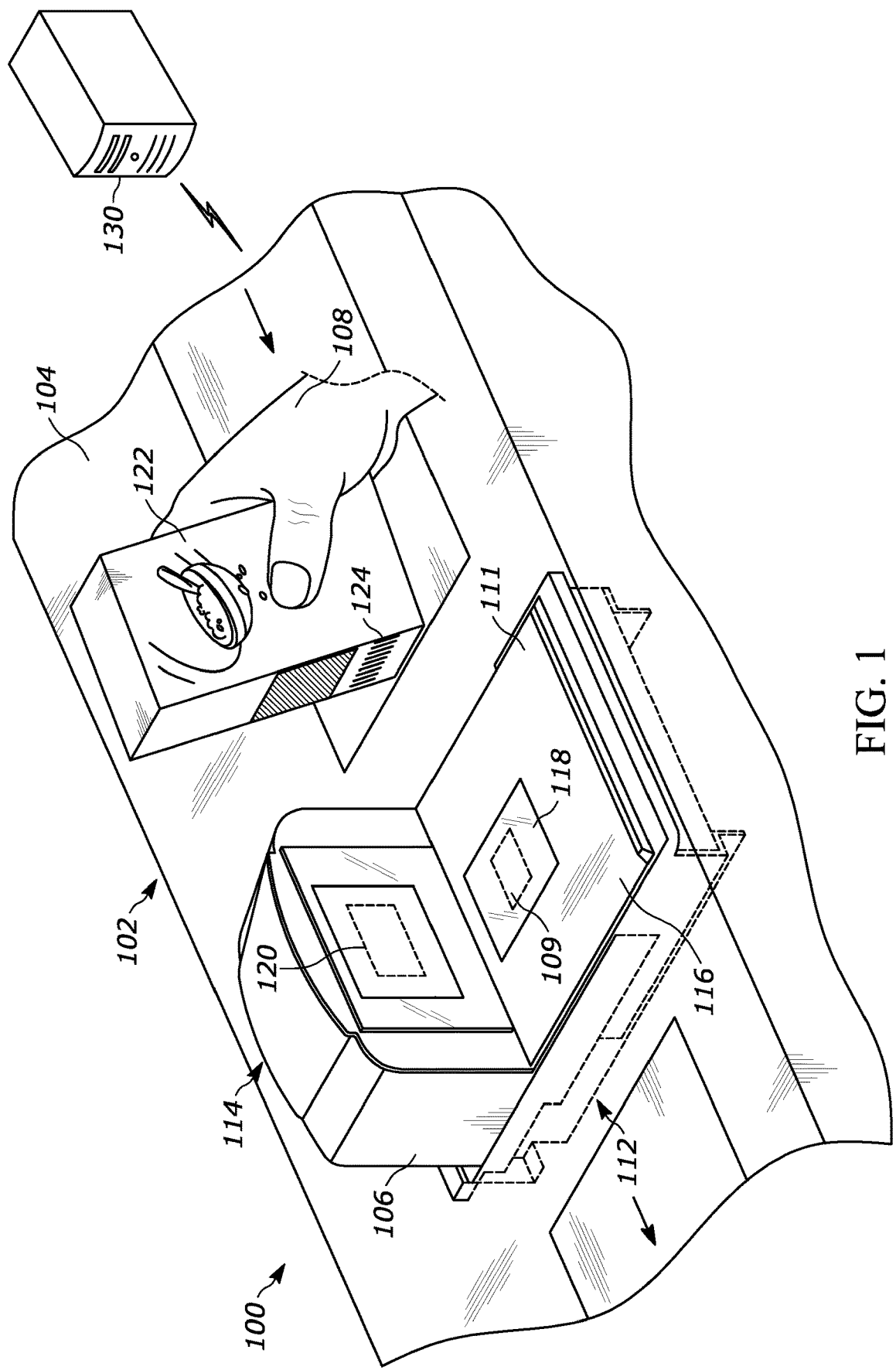
FIG. 1 is a perspective view of an example imaging system, implemented in an example point-of-sale (POS) system, having a bi-optical (also referred to as "bi-optic") barcode reader having a weigh platter.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

FIG. 1 illustrates a perspective view of an example imaging system capable of implementing operations of the example devices. In the illustrated example, an imaging system 100 is in the form of a point-of-sale (POS) system, having a workstation 102 with a workstation surface (e.g., a counter) 104 and a bi-optical (also referred to as "bi-optic") barcode reader 106.

Figure 2:
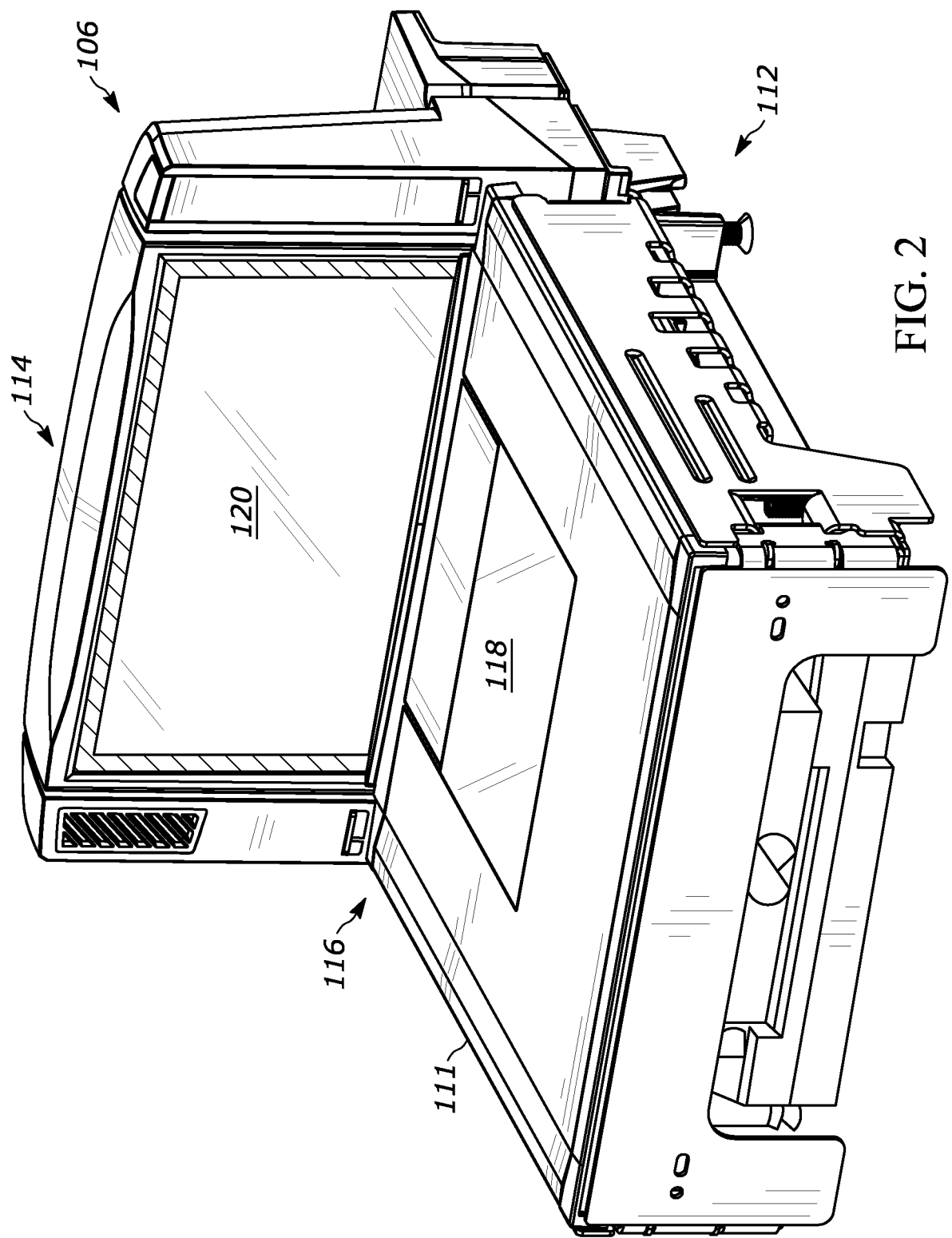
FIG. 2 is a perspective view of an exemplary bi-optic barcode reader having a weigh platter in accordance with an embodiment of the present invention.
Figure 3:
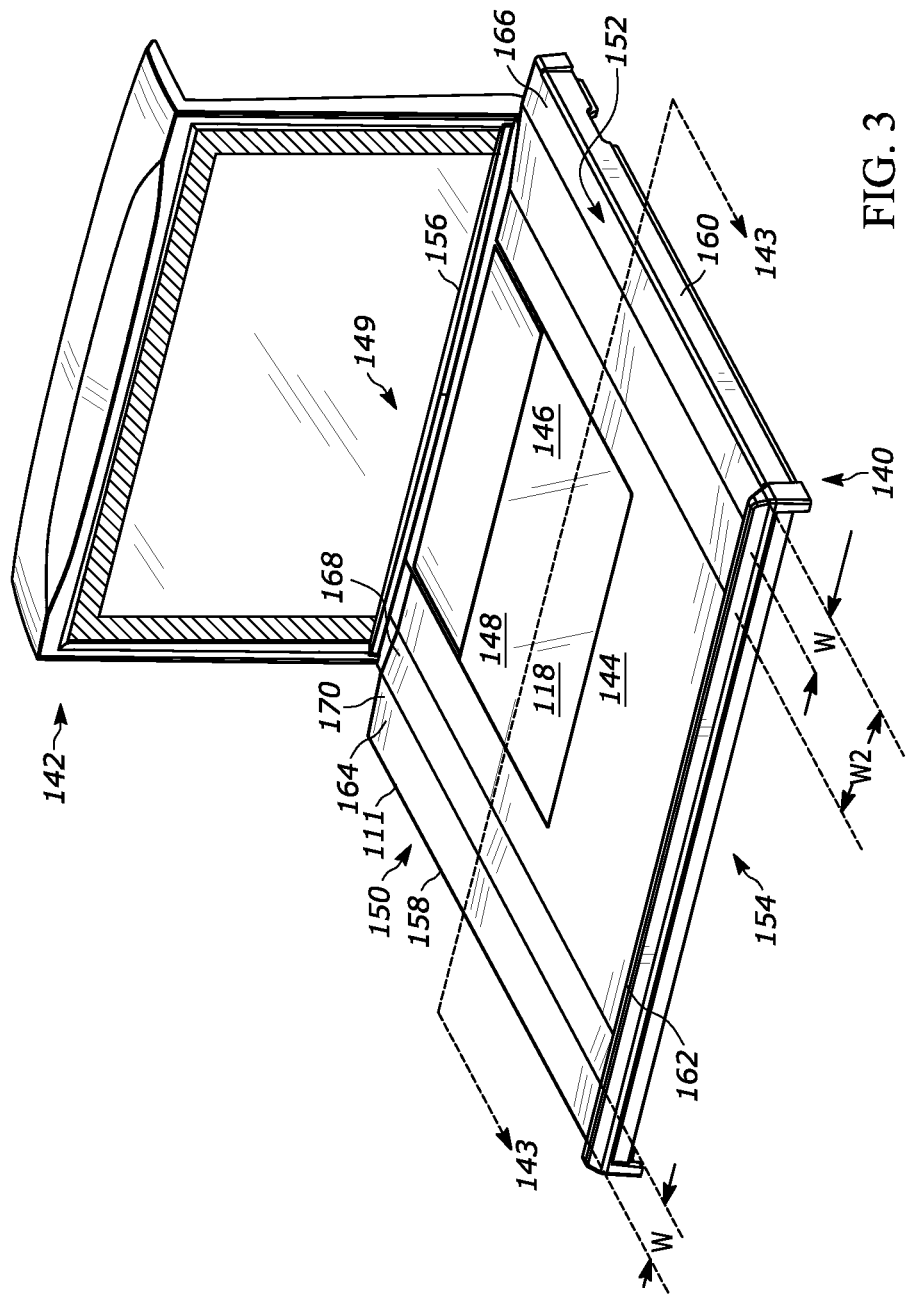
FIG. 3 is a perspective view of the exemplary weigh platter of FIG. 2 with the rest of the bi-optic reader removed.
Figure 7:
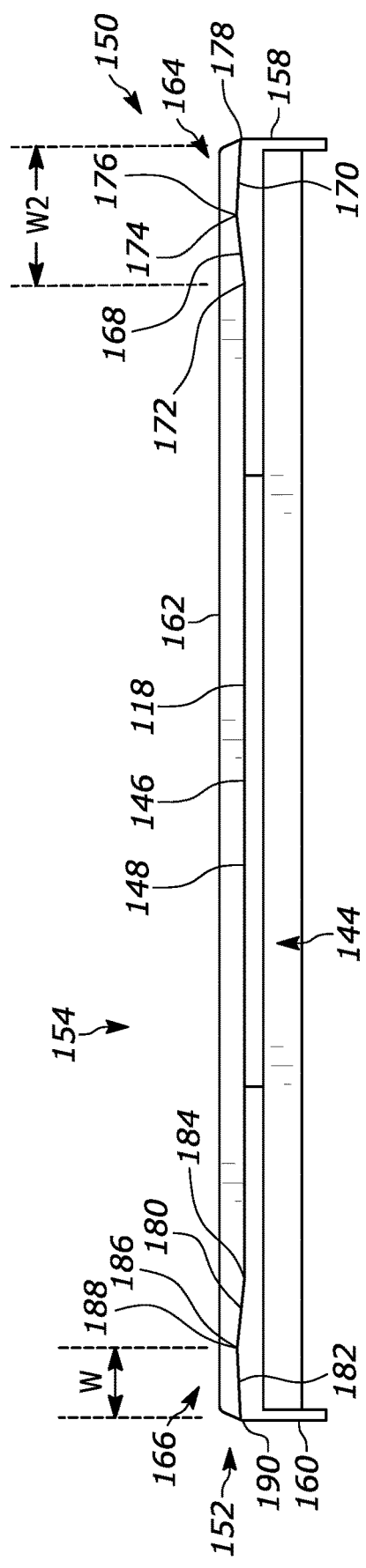

In the illustrated example, also shown in FIG. 2, the barcode reader 106 includes an upper housing 114 (also referred to as an upper portion or tower portion) and a lower housing 112 (also referred to as a lower portion or platter portion). The upper housing 114 is characterized by an optically transmissive window 120 positioned there along a generally vertical plane and a horizontally extending field of view(s) which passes through the window 120. The lower housing 112 is characterized by a weigh platter 111 that includes an optically transmissive window 118 positioned there along a generally horizontal plane and a vertically extending field of view(s) which passes through the window 118. Referring for a moment to FIG. 3, in some embodiments the weigh platter may be comprised of two primary sections, a horizontal section 140 and a vertical section 142. However, this configuration is not essential, and in some cases the vertical section 142 may be omitted, providing only the horizontal section 140. The weigh platter 111 is a part of a weigh platter assembly that will generally include the weigh platter 111 and a scale configured to measure the weight of an object placed on an example surface of the top portion 116, or some portion thereof.

In operation, a user 108 generally passes an item 122 across a product scanning region of the barcode reader 106 in a swiping motion in the general direction 107, which in the illustrated example is right-to-left. It should be appreciated that while items may be swiped past the barcode reader 106 in either direction, items may also be presented into the product scanning region by means other than swiping past the window(s). When the item 122 comes into the any of the fields of view of the reader, the barcode 124 on the item 122 is read and decoded by the barcode reader 106 and corresponding data is transmitted to a communicatively coupled host 130. In other instances, items may need to be weighed in order to be added to the ledger of the transaction. In this case, an item is placed on the top surface 116 of the platter 111 for the barcode reader 106 to sense the weight of said item and transmit information associated with this weight to the host 130.

Referring now to FIG. 3, in a preferred configuration, the weigh platter 111 is designed to constrain items in the central region thereof or otherwise away from its lateral edges. This is achieved by providing the platter with a particularly designed structural features as outlined below. To help further understand the various embodiments disclosed herein, references can also be made to FIGS. 4-10 which are various embodiments of the weigh platter 111 taken along section line 143, looking away from the vertical section 142.

In the example shown in FIG. 3, the weigh platter 111 includes a central region 144 extending in a transverse plane. The central region 144 including a window 118 configured to permit light to pass therethrough. This allows light to pass to the internal imaging components for proper barcode reading. The window 118 normally has a transparent medium 146 that has a top surface 148 extending parallel to the transverse plane of the central region. In a prefer embodiment, this medium is a sapphire glass sheet measuring approximately 4 inches by 6 inches, though other sizes are within the scope of embodiments disclosed herein. While sapphire glass may be preferred due to its scratch-resistant properties, other transparent media may also be used.

Surrounding the central region 144 are a proximal edge region 149, a first lateral edge region 150, a second lateral edge region 152, and a distal edge region 154. As is visible in FIG. 2, when the platter 111 is installed on the bi-optic reader 106, the proximal edge region 149 adjacent to the upper housing portion 114 and includes a proximal edge 156. In other embodiments where the barcode reader may be, for example, a slot scanner, and may not include the upper housing portion 114, the proximal else 156 may be viewed extending substantially along the swiping direction of an item being swiped past the reader.

The first lateral edge region 150 extends non-parallel to the proximal edge 156 and has a first lateral edge 158. In a preferred embodiment, the first lateral edge region 150 is positioned along one side of the window 118, and therefore the central region 144. The second lateral edge region 152 is provided opposite the first lateral edge region 150 and, like the first lateral edge region 150, extends non-parallel to the proximal edge 156 and has its own, second lateral edge 160. Also, the second lateral edge region 152 is positioned along another (opposite) side of the window 118. The remaining region is referred to as the distal edge region 154. It is positioned opposite the proximal edge region 149 extending non-parallel to the first and second lateral edges 158, 160, and includes a distal edge 162.

To help retain the item placed on the platter within the confines thereof, the patter 111 is designed in a way where each of the first lateral edge 158 and the second lateral edge 160 extends at least 1 mm above the transverse plane. In a preferred embodiment, both of the edges 158, 160 extend at least 1 mm but no more than 7 mm above the transverse plane.

In some embodiments it is desirable to install the barcode reader 106 into the workstation 102 such that the lateral edges 158, 160 are substantially on the same plane as the workstation counter/surface 104. In this instance, it should be appreciated that the transverse plane, as defined by the central region 144, will be below the counter/surface 104. In other instances, the lateral edges 158, 160 may extend above the workstation counter/surface 104. However, in this configuration items being dragged between the counter and the platter may bump, scrape, or otherwise impact the edges 158, 160 in an undesirable way.

Referring to the embodiment of FIGS. 3-6, and particularly FIGS. 4-6, the first lateral edge region 150 includes a first-lateral-edge-region surface 164 that extends along at least some portion of the first lateral edge 158 and the second lateral edge region 152 includes a second-lateral-edge-region surface 166 that extends along at least some portion of the second lateral edge 160. It should be appreciated that these surfaces 164, 166 need not be reciprocally identical (though they could be). Nor do they need to extend along each entire respective edge. Moreover, these surfaces need not be positioned immediately adjacent to the respective edges and intervening surfaces may be provided therebetween. However, in the preferred embodiment of this configuration, at least some portion of each of the first-lateral-edge-region surface 164 and the second-lateral-edge-region surface 166 is non-parallel relative to the transverse plane. This can be illustratively discerned with reference to the drawings where the illustrations of FIGS. 4 and 6 show each surface 164, 166 being a flat surface that is angled at an upward slope when viewed in a direction away from the window 118 (with the embodiment of FIG. 4 having the surfaces 164, 166 terminate in the central region 144 before the window 118 and the embodiment of FIG. 6 having the surfaces 164, 166 terminate in the central region 144 at the window 118), and the illustration of FIG. 5 shows each surface 164, 166 being a curved surface that is concave relative to the product scanning region above the platter 111. It should be appreciated that while in some embodiments the curved cross-section profile of each surface 164, 166 may be a circular profile, in other instances is may be ellipsoidal or any other curved profile with a changing slope.

In some embodiments, at least some portions of the lateral-edge-region surfaces 164, 166 may slopes toward the central region 144 at an angle α of at least 2.5 degrees relative to the transverse plane. In some instances, α may be selected between 2.5 degrees and 10 degrees. In other instances α may be selected between 2.5 degrees and 15 degrees.

In some embodiments, at least some portions of the lateral-edge-region surfaces 164, 166 may have a width W that ranges between 10 mm and 100 mm. This width should be measured along the transverse plane. While it would be preferred to have the width W of each of the surfaces 164, 166 be equal, this is not necessary and the respective widths may differ. Additionally, these widths are generally measured with respect to edges of the respective surfaces 164, 166 where an edge may be defined as a change in a surface characteristic, such as, for example, the relative angle along which the surface extends or a nature of the slope changing from a static slope to a variable slope or vice-versa.

Referring now to FIGS. 3 and 7-10, additional embodiments of the platter 111 are provided where each of the lateral-edge-region surfaces 164, 166 is comprised of multiple distinct surfaces. In particular, shown in the illustrations is the lateral-edge surface 164 having a first surface 168 and a second surface 170. The first surface 168 has a first edge 172 proximal the central region 144 and a second edge 174 distal to the central region 144. The second surface 170 has a first edge 176 proximal the second edge 174 of the first surface 168 and a second edge 178 distal to the second edge 174 of the first surface 168. With such an arrangement, the second surface 170 is further away from the central region 144 than the first surface 168. Conversely on the opposite end of the illustrated embodiment, the lateral-edge surface 166 has a first surface 180 and a second surface 182. The first surface 180 has a first edge 184 proximal the central region 144 and a second edge 186 distal to the central region 144. The second surface 182 has a first edge 188 proximal the second edge 186 of the first surface 180 and a second edge 190 distal to the second edge 186 of the first surface 180. With such an arrangement, the second surface 182 is further away from the central region 144 than the first surface 180.

For clarity, the following discussion is made with reference to only one side of the platter 111 and only one set of surfaces. However, it should be appreciated that these configurations may be matched or mixed on both sides of the platter 111 as desired and all such configurations are within the scope of the embodiment(s) described herein.

Having at least some portion of the lateral-edge-region region 150 be comprised of multiple distinct surfaces 168, 170 can allow for various configurations exemplarily disclosed in FIGS. 7-10. For example, in FIG. 7, the arrangement shown therein includes a configuration where, when measured along a direction normal to the transverse plane, the first edge 172 of the first surface 168 is positioned at the transverse plane, the second edge 174 of the first surface 168 is positioned at a first height above the transverse plane, and the second edge 178 of the second surface 170 is positioned as a second height above the transverse plane such that the first height is greater than the second height. This results in the cross-section view of the platter 111 having a "/\_/\"-like profile with the first surface 168 having an upward slope away from the central region 144 and the second surface 170 having a downward slope away from the central region 144.

In an alternate arrangement shown in FIG. 8, in the configuration there, when measured along a direction normal to the transverse plane, the first edge 172 of the first surface 168 is positioned at the transverse plane, the second edge 174 of the first surface 168 is positioned at a first height above the transverse plane, and the second edge 178 of the second surface 170 is positioned as a second height above the transverse plane such that the first height is equal to the second height. This results in the cross-section view of the platter 111 having a "\_/"-like profile with the first surface 168 having an upward slope away from the central region 144 and the second surface 170 being parallel with the transverse plane.

In yet alternate arrangements shown in FIGS. 9 and 10, in the configurations there, when measured along a direction normal to the transverse plane, the first edge 172 of the first surface 168 is positioned at the transverse plane, the second edge 174 of the first surface 168 is positioned at a first height above the transverse plane, and the second edge 178 of the second surface 170 is positioned as a second height above the transverse plane such that the first height is less than the second height. In this case the lateral-edge-region region 150 occupied by the first and second surfaces 168, 170 results either in a concave shape (as shown in FIG. 9) or a convex shape (as shown in FIG. 10).

In some embodiments, the combined width W2, when measured along the transverse plane, between the first edge 172 of the first surface 168 and the second edge 178 of the second surface 170 is between 10 mm and 100 mm.

While the above examples have been provided with flat surfaces, it should be appreciated that surfaces with changing slopes are also within the scope of the invention(s) recited herein. As such, surfaces having changing slopes may replace flat surfaces so long as edges of the various surfaces can be joined together.

Figure 11:
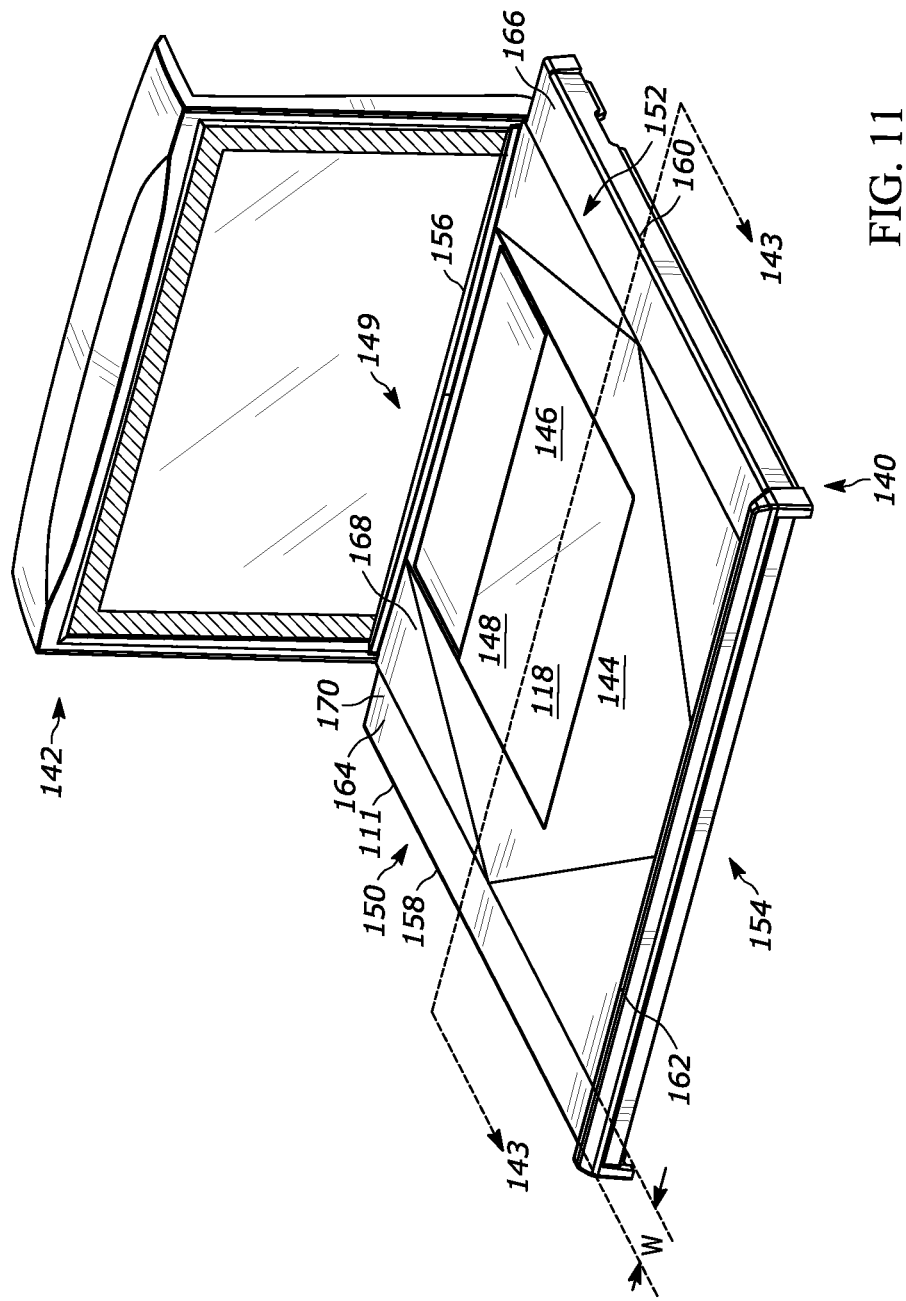
FIG. 11 is another perspective view of an exemplary weigh platter for use with the bi-optic reader of FIG. 2.

Additionally, as shown in FIG. 11, in some embodiments edges of various surfaces may be non-parallel to edges of adjacent surfaces or to edges of the same surface. As is shown therein, the first surface 168 has a first edge 172 that is non-parallel with the second edge 174 of first surface 168, the first surface 176 of the second surface 170, and the second edge 178 of the second surface 170. Despite this, at least one of the first and second surfaces 168, 170 (in the illustrated case surface 168) includes an upward slope away from the central region 144 with the final configuration resulting in the lateral edge 158 being higher than the transverse plane.

The embodiments described herein may be particularly useful for instances where liquids find their way onto the platter of barcode readers. It has been recognized that liquids, when spilled on existing platters have a tendency to transition to regions below the platter, causing structural and electrical issues with barcode readers like those described herein. Similarly, matter which may come off produce can similarly pose issues when it finds its way below the platter. Providing the configurations disclosed herein may reduce those instances as these configurations may help retain foreign matter on a top surface of the platter, allowing a user to remove said matter without causing harm to the reader.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

We claim:

1. A barcode reader comprising:
a housing having a lower housing portion with an upper surface facing a product scanning region and an upper housing portion extending above the lower housing portion; and
a weigh platter configured to support an object placed on the weigh platter for obtaining a weight of the object, the weigh platter having:
 a central region extending in a transverse plane, the central region including a window configured to permit light to pass therethrough, the window having a transparent medium having a top surface extending parallel to the transverse plane;
 a proximal edge region adjacent the upper housing portion and having a proximal edge;
 a first lateral edge region extending non-parallel to the proximal edge and having a first lateral edge, the first lateral edge region being positioned along one side of the window;
 a second lateral edge region, opposite the first lateral edge region, extending non-parallel to the proximal edge and having a second lateral edge, the second lateral edge region being positioned along another side of the window; and
 a distal edge region, opposite the proximal edge region, extending non-parallel to the first and second lateral edges and having a distal edge,
wherein:
 each of the first lateral edge and the second lateral edge extends at least 2 mm above the transverse plane;
 the first lateral edge region includes a first-lateral-edge-region surface extending along at least a portion of the first lateral edge;
 the second lateral edge region includes a second-lateral-edge-region surface extending along at least a portion of the second lateral edge;
 at least some portion of each of the first-lateral-edge-region surface and the second-lateral-edge-region surface is non-parallel relative to the transverse plane;
 the at least some portion of the first-lateral-edge-region surface slopes toward the central region at a first angle of at least 2.5 degrees relative to the transverse plane; and
 the at least some portion of the second-lateral-edge-region surface slopes toward the central region at a second angle of at least 2.5 degrees relative to the transverse plane.

2. A barcode reader comprising:
a housing having a lower housing portion with an upper surface facing a product scanning region and an upper housing portion extending above the lower housing portion; and
a weigh platter configured to support an object placed on the weigh platter for obtaining a weight of the object, the weigh platter having:
 a central region extending in a transverse plane, the central region including a window configured to permit light to pass therethrough, the window having a transparent medium having a top surface extending parallel to the transverse plane;
 a proximal edge region adjacent the upper housing portion and having a proximal edge;
 a first lateral edge region extending non-parallel to the proximal edge and having a first lateral edge, the first lateral edge region being positioned along one side of the window;
 a second lateral edge region, opposite the first lateral edge region, extending non-parallel to the proximal edge and having a second lateral edge, the second lateral edge region being positioned along another side of the window; and
 a distal edge region, opposite the proximal edge region, extending non-parallel to the first and second lateral edges and having a distal edge,
wherein:
 each of the first lateral edge and the second lateral edge extends at least 2 mm above the transverse plane;
 the first lateral edge region includes a first-lateral-edge-region surface extending along at least a portion of the first lateral edge;
 the second lateral edge region includes a second-lateral-edge-region surface extending along at least a portion of the second lateral edge;
 at least some portion of each of the first-lateral-edge-region surface and the second-lateral-edge-region surface is non-parallel relative to the transverse plane; and
 at least one of (i) the at least some portion of the first-lateral-edge-region surface and (ii) the at least some portion of the second-lateral-edge-region surface includes a curved surface.

3. A barcode reader comprising:
a housing having a lower housing portion with an upper surface facing a product scanning region and an upper housing portion extending above the lower housing portion; and
a weigh platter configured to support an object placed on the weigh platter for obtaining a weight of the object, the weigh platter having:
 a central region extending in a transverse plane, the central region including a window configured to permit light to pass therethrough, the window having a transparent medium having a top surface extending parallel to the transverse plane;
 a proximal edge region adjacent the upper housing portion and having a proximal edge;

a first lateral edge region extending non-parallel to the proximal edge and having a first lateral edge, the first lateral edge region being positioned along one side of the window;

a second lateral edge region, opposite the first lateral edge region, extending non-parallel to the proximal edge and having a second lateral edge, the second lateral edge region being positioned along another side of the window; and a distal edge region, opposite the proximal edge region, extending non-parallel to the first and second lateral edges and having a distal edge, wherein:

each of the first lateral edge and the second lateral edge extends at least 2 mm above the transverse plane;

the first lateral edge region includes a first-lateral-edge-region surface extending along at least a portion of the first lateral edge;

the second lateral edge region includes a second-lateral-edge-region surface extending along at least a portion of the second lateral edge;

at least some portion of each of the first-lateral-edge-region surface and the second-lateral-edge-region surface is non-parallel relative to the transverse plane;

at least one of (i) the at least some portion of the first-lateral-edge-region surface and (ii) the at least some portion of the second-lateral-edge-region surface includes a first surface having a first edge proximal the central region and a second edge distal to the central region, and the second edge is between 1 mm and 7 mm above the transverse plane when measured along a direction normal to the transverse plane.

4. The barcode reader of claim 3, wherein the second edge is one of the first lateral edge or the second lateral edge.

5. The barcode reader of claim 3, wherein, when measured along the transverse plane, the first edge is between 10 mm and 100 mm away from the second edge.

6. The barcode reader of claim 3, wherein the barcode reader is configured to be installed in a workstation having a workstation surface, and wherein each of the first lateral edge and the second lateral edge is substantially coplanar with the workstation surface.

7. A barcode reader comprising:

a housing having a lower housing portion with an upper surface facing a product scanning region and an upper housing portion extending above the lower housing portion; and a weigh platter configured to support an object placed on the weigh platter for obtaining a weight of the object, the weigh platter having:

a central region extending in a transverse plane, the central region including a window configured to permit light to pass therethrough, the window having a transparent medium having a top surface extending parallel to the transverse plane;

a proximal edge region adjacent the upper housing portion and having a proximal edge;

a first lateral edge region extending non-parallel to the proximal edge and having a first lateral edge, the first lateral edge region being positioned along one side of the window;

a second lateral edge region, opposite the first lateral edge region, extending non-parallel to the proximal edge and having a second lateral edge, the second lateral edge region being positioned along another side of the window; and a distal edge region, opposite the proximal edge region, extending non-parallel to the first and second lateral edges and having a distal edge, wherein:

each of the first lateral edge and the second lateral edge extends at least 2 mm above the transverse plane;

the first lateral edge region includes a first-lateral-edge-region surface extending along at least a portion of the first lateral edge;

the second lateral edge region includes a second-lateral-edge-region surface extending along at least a portion of the second lateral edge;

at least some portion of each of the first-lateral-edge-region surface and the second-lateral-edge-region surface is non-parallel relative to the transverse plane; and at least one of (i) the at least some portion of the first-lateral-edge-region surface and (ii) the at least some portion of the second-lateral-edge-region surface includes:

a first surface having a first edge proximal the central region and a second edge distal to the central region; and a second surface having a first edge proximal the second edge of the first surface and a second edge distal to the second edge of the first surface, the second surface being further away from the central region than the first surface.

8. The barcode reader of claim 7, wherein, when measured along a direction normal to the transverse plane:

the first edge of the first surface is positioned at the transverse plane;

the second edge of the first surface is positioned at a first height above the transverse plane; and the second edge of the second surface is positioned as a second height above the transverse plane, wherein the first height is one of equal to, greater than, or less than the second height.

9. The barcode reader of claim 8, wherein the second edge of the first surface overlaps the first edge of the second surface.

10. The barcode reader of claim 8, wherein, when measured along the transverse plane, the first edge of the first surface is between 10 mm and 100 mm away from the second edge of the second surface.

11. The barcode reader of claim 8, wherein a difference between the first height and the second height is less than the second height.

12. The barcode reader of claim 7, wherein the barcode reader is configured to be installed in a workstation having a workstation surface, and wherein each of the first lateral edge and the second lateral edge is substantially coplanar with the workstation surface.

13. A barcode reader for use in a workstation having a workstation surface, the barcode reader comprising:

a housing having an upper surface facing a product scanning region where a product is expected to be presented to the barcode reader in a swiping motion along a swiping direction; and a weigh platter configured to support an object placed on the weigh platter for obtaining a weight of the object, the weigh platter having:

a central region extending in a transverse plane, the central region including a window configured to permit light to pass therethrough, the window having a transparent medium having a top surface extending parallel to the transverse plane;

a proximal edge region having a proximal edge extending substantially along the swiping direction;

a first lateral edge region extending non-parallel to the proximal edge and having a first lateral edge, the first lateral edge region being positioned along one side of the window;

a second lateral edge region, opposite the first lateral edge region, extending non-parallel to the proximal edge and having a second lateral edge, the second lateral edge region being positioned along another side of the window; and a distal edge region, opposite the proximal edge region, extending non-parallel to the first and second lateral edges and having a distal edge, wherein each of the first lateral edge and the second lateral edge extends above the transverse plane, and wherein at least one of the first lateral edge region and the second lateral edge region includes a first surface that is non-parallel to the transverse plane, the first surface positioned between the central region and a respective lateral edge of the at least one of the first lateral edge region and the second lateral edge region, the first surface having one of a constant or a changing upward slope, relative to the transverse plane, away from the central region.

14. The barcode reader of claim 13, wherein the at least one of the first lateral edge region and the second lateral edge region further includes a second surface that is parallel to the transverse plane.

15. The barcode reader of claim 13, wherein the at least one of the first lateral edge region and the second lateral edge region further includes a second surface that is non-parallel to the transverse plane, the second surface positioned between the first surface and the respective lateral edge of the at least one of the first lateral edge region and the second lateral edge region, the second surface having one of a constant or a changing downward slope, relative to the transverse plane, away from the central region.

* * * * *